UNITED STATES PATENT OFFICE.

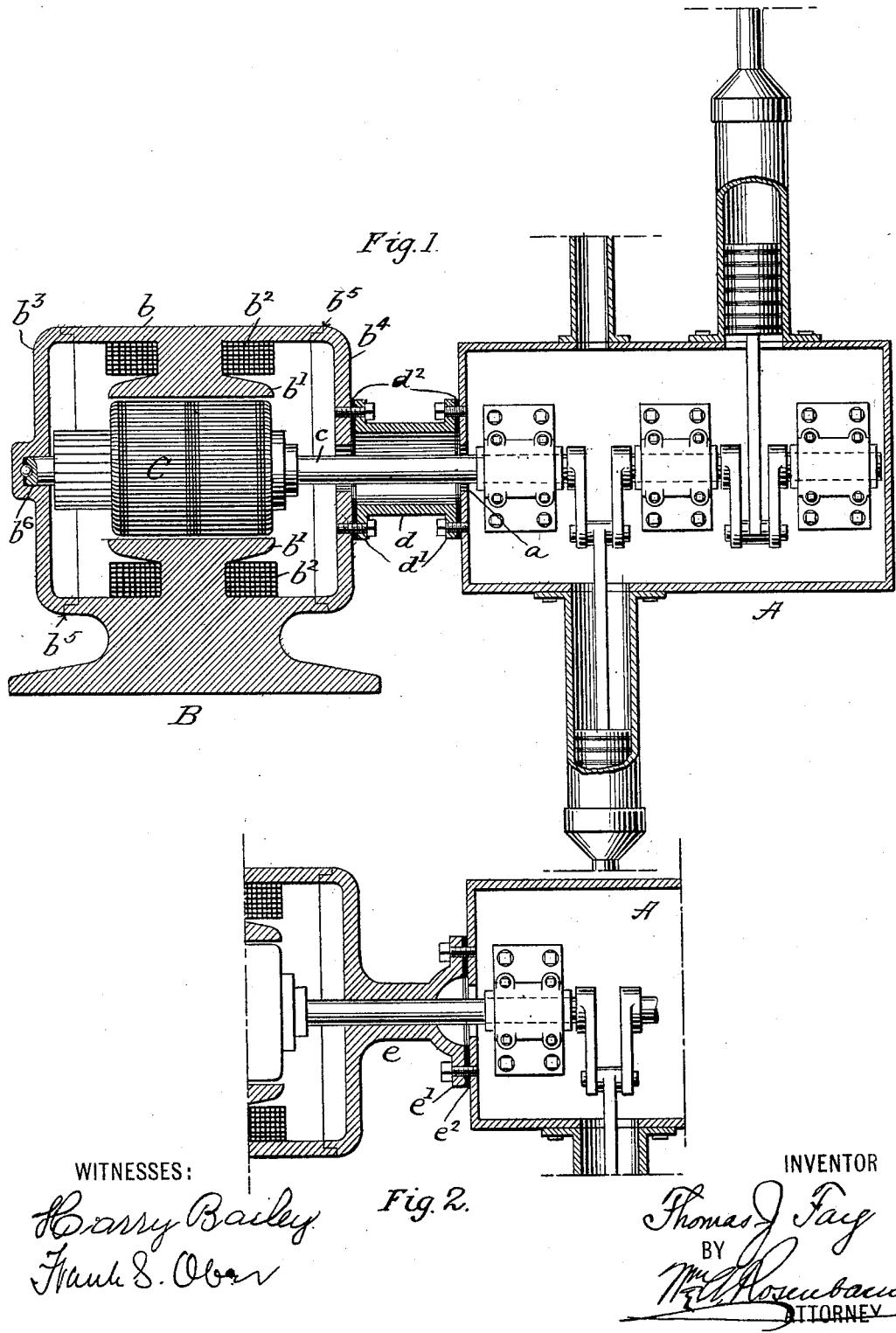

THOMAS J. FAY, OF BROOKLYN, NEW YORK, ASSIGNOR TO THE AMERICAN ELECTRIC COLD SUPPLY COMPANY, OF MAINE.

ELECTRICALLY-DRIVEN GAS-MACHINE.

SPECIFICATION forming part of Letters Patent No. 593,718, dated November 16, 1897.

Application filed February 25, 1897. Serial No. 625,053. (No model.)

*To all whom it may concern:*

Be it known that I, THOMAS J. FAY, a citizen of the United States, residing at Brooklyn, in the county of Kings and State of New York, have invented certain new and useful Improvements in Electrically-Driven Gas-Machines, of which the following is a full, clear, and exact description.

This invention relates to electrically-driven gas-machines especially adapted for use in refrigerating systems.

In some refrigerating processes it is customary to use a gas which must be put under pressure by a power-driven pump. This gas, which has a very bad odor and is otherwise obnoxious, sometimes leaks out of the apparatus and becomes a nuisance. I locate the pump in a hermetically-sealed casing, and if the shaft of the driving-motor passes through a bearing in the side of such case to connect with the machine therein it is found that after a short period of use the bearing will have worn sufficiently to permit of the escape of the gas. The problem is to transmit the power to the pump or other machine in the casing without making it possible for leaks of this character to occur. An electric motor might be placed bodily inside of the sealed casing with the machine which it is to drive; but there are obvious objections to this, such as the necessary enlargement of the case and the inaccessibility of the motor when inspection or repairs are necessary.

My invention provides a way for transmitting power from an electric motor located outside of the case to a machine located inside thereof without permitting of the escape of gas. This is accomplished by using a peculiar type of electric motor in which the field-magnet system forms of itself a sealed inclosure connecting the motor and sealed case by a sealed passage and passing the shaft of such a motor through said passage.

The invention will be more fully described in connection with the accompanying drawings, in which—

Figure 1 is a vertical section of the apparatus constituting my invention, and Fig. 2 is a sectional detail illustrating a modification of the invention.

Referring to the drawings by letter, A represents a hermetically-sealed casing of any character or shape, which is supposed to contain, or through which passes, a gas and which also contains a machine, such as a pump acting upon said gas.

B is an electric motor whose field-magnet system $b$ consists of a cylinder or other closed form of iron, having inwardly-directed pole-pieces $b'$, surrounded by coils of wire $b^2$. The ends of the field-magnet cylinder are closed by heads $b^3$ and $b^4$, respectively, the joint between the cylinder and the heads at $b^5$ being made gas-tight. The head $b^3$ is not perforated at any point, but contains a central socket $b^6$ for the end of the armature-shaft. The other head $b^4$ is perforated at the center for the passage of the armature-shaft and in which it has its bearing.

C is the armature of the motor, and $c$ the armature-shaft. The shaft, as before stated, has one bearing in the socket $b^6$, while another bearing may be formed in the head $b^4$. The shaft passes through this latter bearing and through an opening $a$ in the side of the sealed casing A. There may also be a bearing for the shaft in the opening $a$, but it is not necessary.

That portion of the armature-shaft exposed between the motor and the casing A is surrounded by a sleeve or tube $d$, having flanges $d'$ at each end, by which the ends are respectively secured to the wall of the casing and to the head $b^4$ of the motor. Packing-rings $d^2$ are inserted to make the joints gas-tight. The gas in the casing A may have free access to the interior of the tube and may even escape to the interior of the motor, in case the armature-shaft bearing wears sufficiently, but it can never escape to the atmosphere outside and so become a nuisance.

A modification of the invention is shown in Fig. 2, wherein the tube $d$ is dispensed with and the bearing $e$ for the armature-shaft is provided with a flange $e'$, which may be bolted to the wall of the casing A, a packing-ring $e^2$ being inserted to make the joint tight. An obvious modification of this idea would be to place the bearing in the wall of the casing A and bolt the flange to the head $b^4$ of the motor. The invention, however, is not limited to any special construction, but comprehends a motor whose field-magnet system constitutes a sealed casing, in combination with the sealed gas-casing and a sealed gas-passage connecting the motor and casing together, through which passage the motor-shaft leads, it being understood that the term "passage" may mean one formed by a tube similar to d or merely one formed by the bearing or bearings of the shaft.

Having thus described my invention, I claim—

1. The combination of a sealed gas-casing, an electric motor located outside thereof and whose field-magnet system itself forms a sealed casing, and a sealed gas-passage connecting the motor and casing together and through which the armature-shaft leads, substantially as described.

2. The combination of a sealed gas-casing, an electric motor located outside thereof and whose field-magnet system itself forms a sealed casing and a sealed tube or sleeve connecting the motor and casing together and through which the armature-shaft leads, substantially as described.

In testimony whereof I subscribe my signature in presence of two witnesses.

THOMAS J. FAY.

Witnesses:
FRANK S. OBER,
HARRY BAILEY.